United States Patent
Sohmshetty et al.

(10) Patent No.: US 12,222,704 B2
(45) Date of Patent: Feb. 11, 2025

(54) ROBOTIC ASSISTED TOOL AND DIE MAKING SYSTEMS AND METHODS

(71) Applicant: Ford Global Technologies, LLC, Dearborn, MI (US)

(72) Inventors: Raj Sohmshetty, Canton, MI (US); Kyle Saul, Berkley, MI (US); Ramesh Parameswaran, Farmington Hills, MI (US); Elizabeth Bullard, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 17/874,775

(22) Filed: Jul. 27, 2022

(65) Prior Publication Data
US 2024/0036550 A1 Feb. 1, 2024

(51) Int. Cl.
G05B 13/02 (2006.01)
G05B 19/4155 (2006.01)

(52) U.S. Cl.
CPC ..... G05B 19/4155 (2013.01); G05B 13/0265 (2013.01); *G05B 2219/40269* (2013.01); *G05B 2219/45031* (2013.01)

(58) Field of Classification Search
CPC ............ G05B 19/4155; G05B 13/0265; G05B 2219/40269; G05B 2219/45031

USPC ......................................................... 700/121
See application file for complete search history.

(56) References Cited

U.S. PATENT DOCUMENTS

| | | | |
|---|---|---|---|
| 5,077,941 A * | 1/1992 | Whitney | B24B 49/16 451/6 |
| 10,272,572 B2 | 4/2019 | Podnar | |
| 11,265,513 B2 | 3/2022 | Schmirler et al. | |
| 2016/0346923 A1 | 12/2016 | Kesil et al. | |
| 2017/0185068 A1* | 6/2017 | Nishi | G05B 19/4063 |
| 2021/0008714 A1 | 1/2021 | Griffin et al. | |
| 2021/0149655 A1 | 5/2021 | Mathews et al. | |
| 2022/0274215 A1* | 9/2022 | Mathys | G06T 7/0004 |

* cited by examiner

*Primary Examiner* — Jigneshkumar C Patel
(74) *Attorney, Agent, or Firm* — Burris Law, PLLC (57) ABSTRACT

A method for automating a die fabrication process includes obtaining, by one or more controllers, die sensor data from one or more die sensors and image data from one or more image sensors, generating, by the one or more controllers, a command to perform one or more machining tool operations based on the die sensor data and the image data, and controlling, by the one or more controllers, a machining tool to perform the one or more machining tool operations. The method includes selectively adjusting, by the one or more controllers, a position of a robotic arm based on the one or more machining tool operations and training an artificial intelligence system to autonomously perform the die fabrication process based on the one or more machining tool operations, the position of the robotic arm, the image data, the die sensor data, or a combination thereof.

20 Claims, 6 Drawing Sheets

ROBOTIC ASSISTED TOOL AND DIE MAKING SYSTEMS AND METHODS

FIELD

The present disclosure relates to robotic assisted tool and die making systems and methods.

BACKGROUND

The statements in this section merely provide background information related to the present disclosure and may not constitute prior art.

In a manufacturing environment, stamping dies and tools are used to fabricate various components, such as automotive body structure parts. However, the stamping dies are often subjected to various quality inspection routines and narrow quality tolerances. As such, the fabrication and quality inspection processes for stamping dies are labor and resource intensive. These issues with stamping dies, among other issues, are addressed by the present disclosure.

SUMMARY

This section provides a general summary of the disclosure and is not a comprehensive disclosure of its full scope or all of its features.

The present disclosure provides a method for automating a die fabrication process. The method includes obtaining, by one or more controllers, die sensor data from one or more die sensors and image data from one or more image sensors, generating, by the one or more controllers, a command to perform one or more machining tool operations based on the die sensor data and the image data, and controlling, by the one or more controllers, a machining tool to perform the one or more machining tool operations. The method includes selectively adjusting, by the one or more controllers, a position of a robotic arm based on the one or more machining tool operations and training, by the one or more controllers, an artificial intelligence system to autonomously perform the die fabrication process based on the one or more machining tool operations, the position of the robotic arm, the image data, the die sensor data, or a combination thereof.

In one form, the command is based on an input generated by a haptic glove. In one form, the die sensor data is indicative of a surface roughness of a die, one or more dimensional parameters of the die, or a combination thereof, and where the one or more die sensors include an optical sensor, a range sensor, a digital micrometer, or a combination thereof. In one form, the method further includes generating, by a display device, a graphical element based on the image data, the die sensor data, or a combination thereof, where the display device is one of an augmented reality display device and a virtual reality display device. In one form, the graphical element includes the image data that is overlayed with the die sensor data. In one form, the graphical element includes a first graphical element associated with a first portion of a die, the graphical element includes a second graphical element associated with a second portion of the die, the first graphical element is indicative of the first portion of the die satisfying a die tolerance condition, and the second graphical element is indicative of the second portion of the die not satisfying the die tolerance condition.

In one form, the artificial intelligence system is a reinforcement learning network. In one form, training the reinforcement learning network to autonomously perform the die fabrication process further comprises: generating a state vector based on the one or more machining tool operations, the position of the robotic arm, an input received by the one or more controllers, and the die sensor data, and the die sensor data, defining one or more actions associated with the state vector, wherein each action from among the one or more actions includes performing a machining tool operation, adjusting the position of the robotic arm, or a combination thereof, determining a reward for each of the one or more actions, and generating a plurality of entries of a state-action database based on the one or more actions and the reward associated with the one or more actions, wherein the reinforcement learning network is configured to autonomously perform the die fabrication process based on the plurality of entries.

In one form, the artificial intelligence system is a convolutional neural network. In one form, where training the convolutional neural network to autonomously perform the die fabrication process based on the one or more machining tool operations, the position of the robotic arm, the image data, and the die sensor data further comprises generating a training image based on the one or more machining tool operations, the position of the robotic arm, the image data, and the die sensor data, labeling the training image based on a comparison between the die sensor data and a die tolerance condition, and selectively adjusting one or more parameters of the convolutional neural network based on the training image and one or more additional training images.

The present disclosure provides a system for automating a die fabrication process. The system includes a processor and a nontransitory computer-readable medium including instructions that are executable by the processor. The instructions include obtaining die sensor data from one or more die sensors and image data from one or more image sensors, generating a command to perform one or more machining tool operations based on the die sensor data and the image data, and controlling a machining tool to perform the one or more machining tool operations. The instructions include selectively adjusting a position of a robotic arm based on the one or more machining tool operations and training an artificial intelligence system to autonomously perform the die fabrication process based on the one or more machining tool operations, the position of the robotic arm, the image data, the die sensor data, or a combination thereof, where the artificial intelligence system is one of a reinforcement learning network and a convolutional neural network.

In one form, the command is based on an input generated by a haptic glove. In one form, the die sensor data is indicative of a surface roughness of a die, one or more dimensional parameters of the die, or a combination thereof, and where the one or more die sensors include an optical sensor, a range sensor, a digital micrometer, or a combination thereof. In one form, the instructions further comprise generating, by a display device, a graphical element based on the image data, the die sensor data, or a combination thereof, where the display device is one of an augmented reality display device and a virtual reality display device. In one form, the graphical element includes a first graphical element associated with a first portion of a die, the graphical element includes a second graphical element associated with a second portion of the die, the first graphical element is indicative of the first portion of the die satisfying a die tolerance condition, and the second graphical element is indicative of the second portion of the die not satisfying the die tolerance condition.

In one form, the artificial intelligence system is a reinforcement learning network, and the instructions for training the reinforcement learning network to autonomously perform the die fabrication process based on the one or more machining tool operations, the position of the robotic arm, the image data, and the die sensor data further comprise: generating a state vector based on the one or more machining tool operations, the position of the robotic arm, an input received by the one or more controllers, and the die sensor data, defining one or more actions associated with the state vector, wherein each action from among the one or more actions includes performing a machining tool operation, adjusting the position of the robotic arm, or a combination thereof, determining a reward for each of the one or more actions, and generating a plurality of entries of a state-action database based on the one or more actions and the reward associated with the one or more actions, wherein the reinforcement learning network is configured to autonomously perform the die fabrication process based on the plurality of entries.

In one form, the artificial intelligence system is a convolutional neural network. In one form, where the instructions for training the convolutional neural network to autonomously perform the die fabrication process based on the one or more machining tool operations, the position of the robotic arm, the image data, and the die sensor data further comprise: generating a training image based on the one or more machining tool operations, the position of the robotic arm, the image data, and the die sensor data, labeling the training image based on a comparison between the die sensor data and a die tolerance condition, and selectively adjusting one or more parameters of the convolutional neural network based on the training image and one or more additional training images.

The present disclosure provides a method for automating a die fabrication process. The method includes obtaining die sensor data from one or more die sensors and image data from one or more image sensors, generating a command to perform one or more machining tool operations based on the die sensor data and the image data, and controlling a machining tool to perform the one or more machining tool operations. The method includes selectively adjusting a position of a robotic arm based on the one or more machining tool operations and training an artificial intelligence system to autonomously perform the die fabrication process based on the one or more machining tool operations, the position of the robotic arm, the image data, the die sensor data, or a combination thereof, where the artificial intelligence system is one of a reinforcement learning network and a convolutional neural network.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for automating a die fabrication process. An operator may remotely control one or more machining operations performed on a die, and sensor data related to the die fabrication environment along with the machining operations and inputs generated by the remote operator are used to train an artificial intelligence system to autonomously perform the die fabrication process. As such, the remote automation of die fabrication processes decentralizes die fabrication processes by inhibiting the onsite time and labor-intensive resources associated with die fabrication processes and improves the efficiency of the die fabrication processes.

Figure 1:
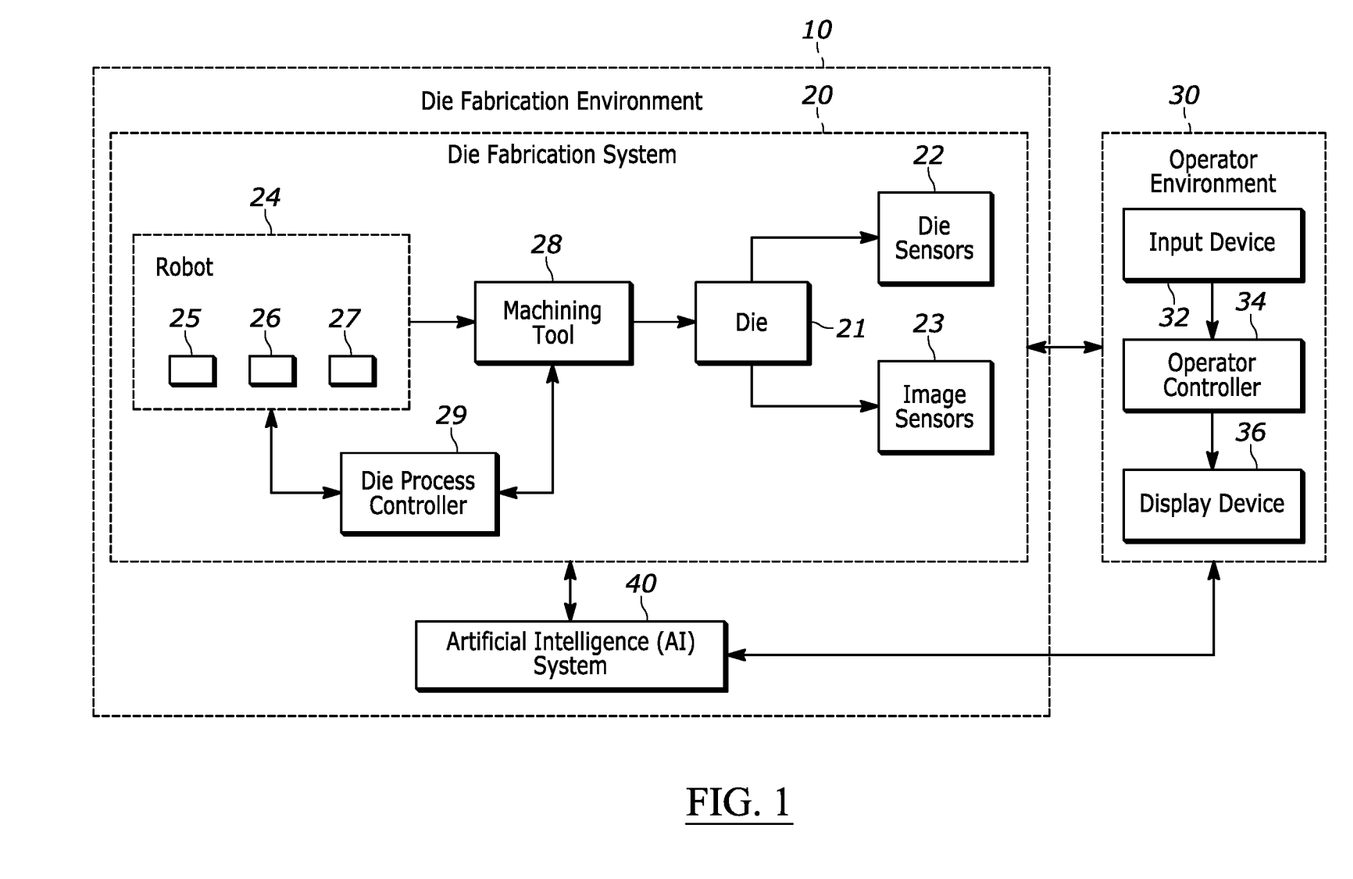
FIG. 1 is a functional block diagram of a die fabrication environment and an operator environment in accordance with the teachings of the present disclosure.

Referring to FIG. 1, a die fabrication environment 10 for manufacturing a die (e.g., a stamping die of a vehicle) and an operator environment 30 are shown. In one form, the die fabrication environment 10 includes a die fabrication system 20 and an artificial intelligence (AI) system 40, and the operator environment 30 includes an operator controller 32, an input device 34, and a display device 36. While the components of the operator environment 30 are positioned remotely from the die fabrication environment 10, it should be understood that the components of the operator environment 30 may be included as part of the die fabrication environment 10 in other forms. In one form, the die fabrication system 20, the components of the operator environment 30, and the AI system 40 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the die fabrication system 20 includes a die 21, one or more die sensors 22, one or more image sensors 23, a robot 24, one or more machining tools 28, and a die process controller 29. In one form, the die 21 is a stamping die that cuts and forms sheet metal into a desired shape, profile, roughness, dimension, among other parameters of the sheet metal. It should be understood that the die 21 may be provided by other types of dies in other forms, such as drawing dies or casting dies.

In one form, the one or more die sensors 22 are configured to provide die sensor data that is indicative of a surface roughness or dimensional parameters (length, width, or area, among other dimensional parameters) of the die 21. As an example, the one or more die sensors 22 may include, but are not limited to: an optical sensor, a radar scanner, a laser scanner, a light detection and ranging (LIDAR) sensor, an ultrasonic sensor, an infrared sensor, a digital micrometer, and/or other sensors configured to detect the surface roughness and/or dimensional parameters of the die 21. It should be understood that the one or more die sensors 22 may be provided by any types of sensors configured to detect the surface roughness or dimensional parameters of the die 21 and are not limited to the examples described herein. As described herein in greater detail, an operator is configured to remotely control, via the operator controller 32, one or more steps of a die fabrication process and train the AI system 40 to autonomously perform the die fabrication process based on the die sensor data generated by the one or more die sensors 22.

In one form, the one or more image sensors 23 are configured to obtain image data of the die fabrication environment 10, such as the die 21, the robot 24, and the one or more machining tools 28. As an example, the one or more image sensors 23 may include, but are not limited to: a two-dimensional (2D) camera, a three-dimensional (3D) camera, among others. It should be understood that the one or more image sensors 23 may be provided by any types of image sensors and are not limited to the examples described herein. As described herein in greater detail, an operator is configured to remotely control, via the operator controller 32, one or more steps of a die fabrication process and train the AI system 40 to autonomously perform the die fabrication process based on the image data generated by the one or more image sensors 23.

In one form, the robot 24 includes a robotic arm 25 with varying range of motion and a robot controller 26 configured to operate the robotic arm 25 to perform one or more automated tasks. In one form, the robot 24 includes one or more robot sensors 27 to generate data corresponding to various operating metrics of the robot 24. As an example, the robot sensors 27 may include an accelerometer, a gyroscope, and/or a magnetometer configured to generate orientation information of the robot 24. As yet another example, the robot sensors 27 may include a velocity sensor configured to generate velocity information of the robot 24, a power sensor to measure current and/or voltage being applied by a power source, a torque sensor configured to generate torque information of various joints of the robot 24, and/or a touch sensor at a handle of the robot 24 configured to detect contact with the one or more machining tools 28. The robot sensors 27 are configured to provide the data to the robot controller 26 for further processing and for controlling the robotic arm 25. While specific examples are provided herein, the robot 24 may include other sensors and are not limited to the sensors described herein.

The robot controller 26 includes computer-readable instructions that are executed by one or more processors of the robot controller 26. As an example, the robot controller 26 includes instructions that, when executed, cause the robot controller 26 to execute predefined automated tasks stored in a task library/database (not shown). The predefined automated tasks may refer to one or more motions the robot 24 performs to achieve a desired result. In some forms, the predefined automated tasks are associated with one or more robotic commands to be provided to the robot controller 26 for having the robot 24 execute the automated task. The robotic commands may include operation parameters for the robot 24, such as operation state (e.g., wait, stop, off, moving, etc.), speed, trajectory, acceleration, torque, rotation directions, among others.

In one form, the one or more machining tools 28 are provided by a tool that is configured to perform a machining tool operation on the die 21. As an example, the one or more machining tools 28 may include a cutting tool that performs a cutting operation (as the machining tool operation) on the die 21, such as a lathe, drill press, milling machine, grinder, rotary tools, among other cutting tools. As another example, the one or more machining tools 28 may include a shaping tool that performs a shaping operation (as the machining tool operation) on the die 21, such as a grinder, planer, sander, among other shaping tools. It should be understood that the one or more machining tools 28 may be provided by various other machining tools that perform similar or different machining tool operations and are not limited to the examples described herein.

In one form, the die process controller 29 is configured to perform one or more machining tool operations by controlling the operation of the one or more machining tools 28 and the robot 24 via the robot controller 26. As described below in further detail, the selection of a particular step of the die fabrication process is based on a command broadcasted by the operator controller 32 via the input device 34.

In one form, the operator controller 32 obtains the die sensor from the one or more die sensors 22 and the image data from the one or more image sensors 23. Subsequently, the operator controller 32 instructs the display device 36 to generate one or more graphical elements (i.e., images, video, text, or a combination thereof) based on the image data, the die data, or a combination thereof. As an example, the one or more graphical elements may include textual or image representations of the dimensional parameters, the surface roughness, and/or machining instructions associated with a given portion of the die 21. To perform the functionality described herein, the display device 36 may be provided any device configured to generate the graphical elements, such as a touchscreen display, a virtual reality display device, an augmented reality display device, a desktop/laptop computer display, or a mobile device display, among other display devices.

Figure 2:
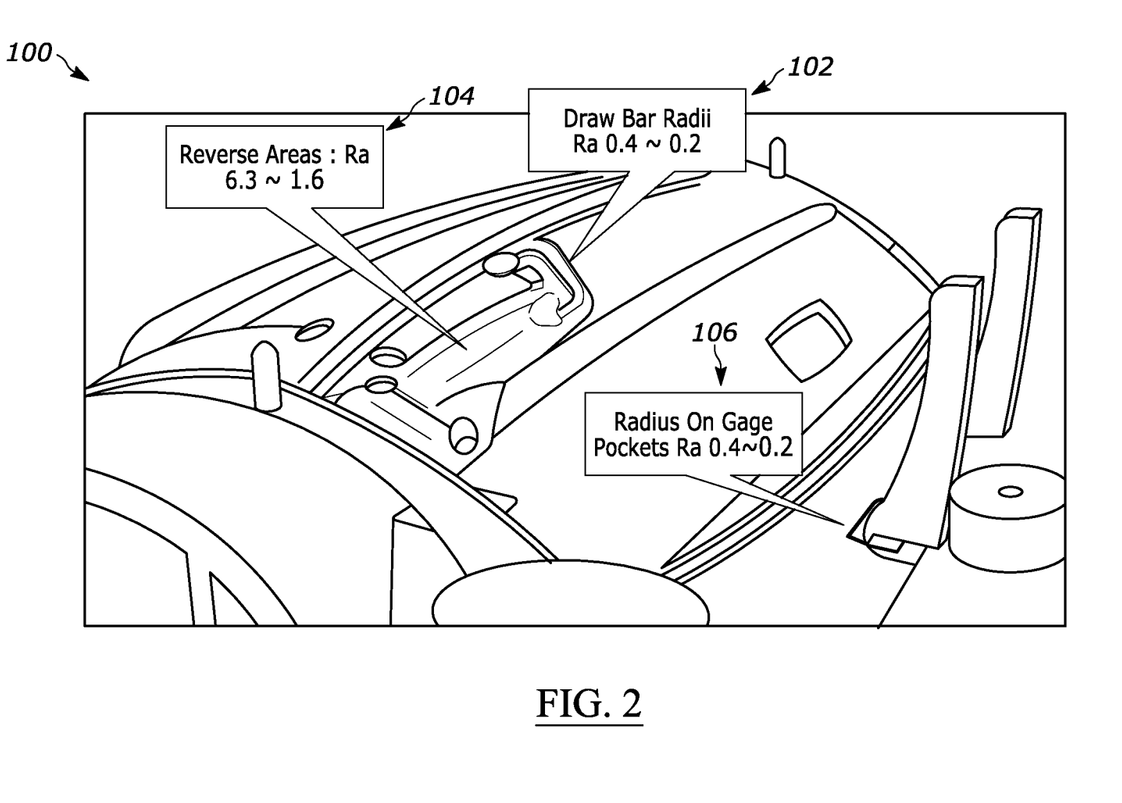
FIG. 2 schematically illustrates a graphical element generated by the display device in accordance with the teachings of the present disclosure.

As an example and referring to FIG. 2, the operator controller 32 instructs the display device 36 to display an image 100 corresponding to the image data of die 21-1 overlayed with one or more graphical elements corresponding to the die sensor data of the die 21-1. Specifically, the image 100 may include a first graphical element 102 that identifies a draw bar radius (as the dimensional parameter) of a first portion of the die 21-1, a second graphical element 104 that identifies an area (as the dimensional parameter) of a second portion of the die 21-1, and a third graphical element 106 that identifies a gage pocket radius (as the dimensional parameter) of a third portion of the die 21-1. In some forms, the graphical elements 102, 104, 106 may include further characteristics (e.g., color-coded, varying shapes, among other characteristics) to indicate whether the given portion of the die 21-1 satisfies a die tolerance condition, such as a surface roughness condition (i.e., whether the surface roughness is within a predefined tolerance) and/or a dimensional tolerance condition (i.e., whether the length, width, radius, or other dimensional parameter is within a predefined tolerance).

Figure 3:
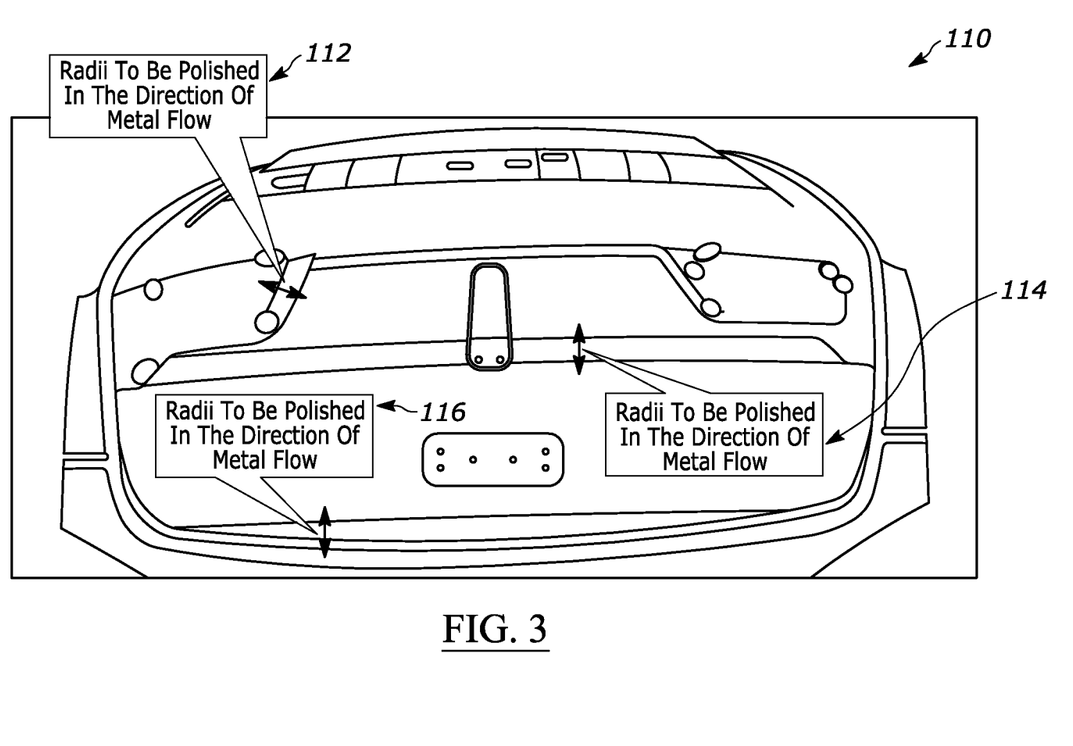
FIG. 3 schematically illustrates another graphical element generated by the display device in accordance with the teachings of the present disclosure.

As another example and referring to FIG. 3, the operator controller 32 instructs the display device 36 to display an image 110 corresponding to the image data of die 21-2 overlayed with one or more graphical elements corresponding to the die sensor data of the die 21-2. Specifically, the image 100 may include a first graphical element 112 that provides machining instructions for a first draw bar of the die 21-2, a second graphical element 114 that provides machining instructions for a second draw bar of the die 21-2 (e.g., a second draw bar), and a third graphical element 116 that provides machining instructions for a third draw bar of the die 21-2.

In one form and referring to FIG. 1, the operator controller 32 receives inputs from the input device 34 corresponding to an instruction to perform a machining tool operation. To generate the input, the input device 34 may be provided by any suitable device, such as a haptic glove, an augmented reality input device, a virtual reality input device, joystick, button, keyboard, mouse, graphical user interface element of a touchscreen device, among other input devices. As an example, a virtual reality device (as the display device 36) displays image data of the die 21 and overlays graphical elements corresponding to the surface roughness, dimensional parameters, and/or machining instructions associated with various portions of the die 21. Subsequently, the operator manipulates a haptic glove (as the input device 34) to generate an input corresponding to performing a given step of a die fabrication process (e.g., a cutting or shaping operation).

In response to receiving an input from the input device 34, the operator controller 32 broadcasts a command to the die process controller 29 to control the one or more machining tools 28 to perform the machining tool operation. As an example, when the command is associated with a cutting operation, the die process controller 29 instructs the robot controller 26 to selectively adjust the position of the robotic arm 25 to retrieve a cutting tool (as the machining tool 28) from a tool holder (not shown) and position the cutting tool proximate to the die 21. Furthermore, the die process controller 29 instructs the robot controller 26 to operate and dynamically adjust the position of the cutting tool to perform the machining tool operation when the cutting tool is proximate to the die 21. As another example, when the command is associated with a shaping operation, the die process controller 29 instructs the robot controller 26 to selectively adjust the position of the robotic arm 25 to retrieve a shaping tool (as the machining tool 28) from the tool holder and position the shaping tool proximate to the die 21. Furthermore, the die process controller 29 instructs the robot controller 26 to operate and dynamically adjust the position of the shaping tool to perform the machining tool operation when the shaping tool is proximate to the die 21. It should be understood that the die 21 may be provided at various locations of the die fabrication environment 10 as it is subjected to the machining tool operation, such as within a stamping press (not shown) of the die fabrication environment 10.

While the die process controller 29 is controlling the one or more machining tools 28 to perform the machining tool operation based on the input received by the input device 34, the AI system 40 is configured to perform a training routine to autonomously train itself to perform a die fabrication process (i.e., without operator input) based on the one or more machining tool operations, the positions of the robotic arm, the image data, the die sensor data, the inputs received by the input device 34, or a combination thereof. To perform the functionality described herein, the AI system 40 may be provided by a reinforcement learning network (RLN) or a convolutional neural network (CNN) that is trained to autonomously perform the die fabrication process.

Figure 4A:
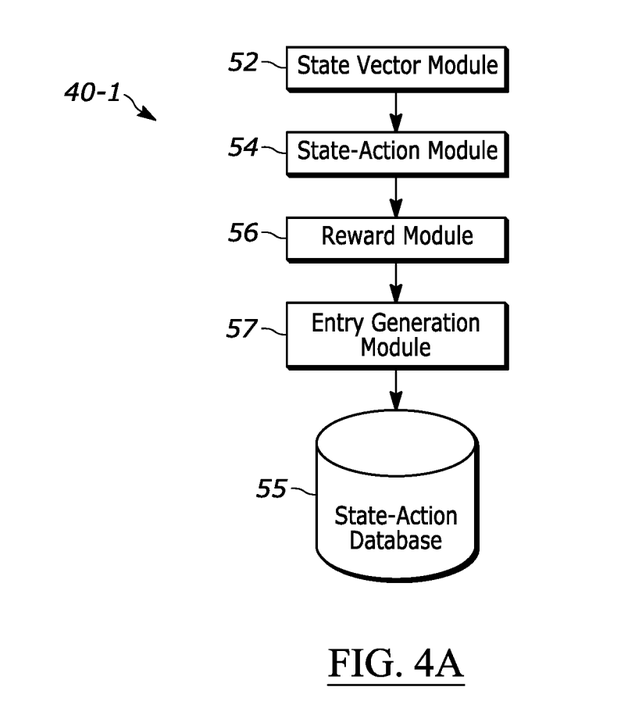
FIG. 4A is a functional block diagram of a reinforcement learning network that is untrained in accordance with the teachings of the present disclosure.
Figure 4B:
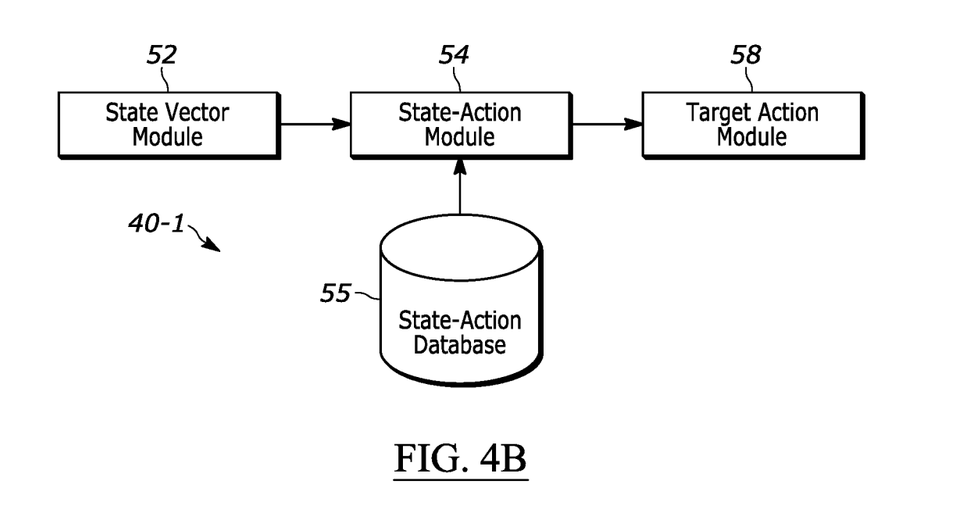
FIG. 4B is a functional block diagram of a reinforcement learning network that is trained in accordance with the teachings of the present disclosure.

As an example and referring to FIGS. 4A-4B, AI system 40-1 (as the AI system 40) is a RLN that includes a state vector module 52, a state-action module 54, a state-action database 55, a reward module 56, an entry generation module 57, and a target action module 58. When the AI system 40-1 is untrained (as shown in FIG. 4A) and while the die process controller 29 is controlling the one or more machining tools 28 to perform the machining tool operation, the state vector module 52 obtains data indicative of the machining tool operations, the positions of the robotic arms 25, the die sensor data, and/or the inputs received by the input device 34 and generates a plurality of state vectors. In one form, each state vector indicates, for a given discrete time value, a machining tool operation, die sensor data and/or information indicating whether the die tolerance condition is satisfied, the position of the robotic arm 25 associated with the machining tool operation, and the input associated with the machining tool operation. As an example, the state vectors ($S^t$) may be represented based on the following relation:

$$S^t = (S_1^t, S_2^t, S_3^t, S_4^t) \qquad (1)$$

In relation (1), each element corresponds to one of the data indicative of the machining tool operations, the positions of the robotic arms 25, the die sensor data, and the inputs received by the input device 34, and t is the discrete time value or time range associated with the obtained data.

In one form, the state-action module 54 defines a plurality of actions associated with the state vectors. The plurality of actions may include, but are not limited to: a machining tool operation (e.g., a cutting operation or a shaping operation), a machining tool retrieval operation (i.e., retrieving the machining tool 28 from the tool holder), and a state-remain operation. As used herein, "state-remain operation" refers to the die process controller 29 maintaining the current operation type (e.g., maintaining a cutting operation). In one form, the state-action module 54 defines an action for various data values of each action type.

In one form, the state-action module 54 associates the set of actions with one or more action identification rules. As an example, the one or more action identification rules may correspond to the identification of only the cutting operations, shaping operations, or state-remain action for a given state vector type (e.g., when the state vector indicates the die sensor data does not satisfy the die tolerance condition). As another example, the one or more action identification rules may correspond to the identification of only the cutting operations or shaping operations for another state vector type (e.g., when the state vector indicates a new input is received).

In one form, the reward module 56 is configured to determine a reward for each action known reinforcement learning routines (e.g., Q-learning routines having a learning rate equal to 0). The reward value is indicative of a qualitative and/or quantitative metric associated with the predicted resulting die sensor data. As an example, larger reward values may correspond to improved qualitative/quantitative metrics associated with the die sensor data, and smaller reward values may correspond to worsened qualitative/quantitative metrics associated with the die sensor data.

In one form, the entry generation module 57 associates each of the actions generated by the state action module 54 and the corresponding reward value generated by the reward module 56 and generates an entry for each of the corresponding state-action-reward value. Furthermore, the entry generation module 57 stores the generated entries in the state-action database 55, and the AI system 40-1, when sufficiently trained, autonomously performs the die fabrication process based on the entries of the state-action database 55.

As an example, when the AI system 40-1 is trained (as shown in FIG. 4B), the state vector module 52 generates a state vector based on data indicative of the machining tool operations, the positions of the robotic arms 25, the die sensor data, and the inputs received by the input device 34, and the state-action module 54 identifies a set if actions in the state-action database 55 associated with the state vector. Furthermore, the target action module 58 selects a target action from among the set of actions based on each of the rewards. As an example, the target action module 58 selects the target action as the action having the highest reward value. By selecting the action associated with the largest reward value, the AI system 40-1 can autonomously perform the die fabrication process while enhancing the efficiency and accuracy of the die fabrication process.

Figure 5:
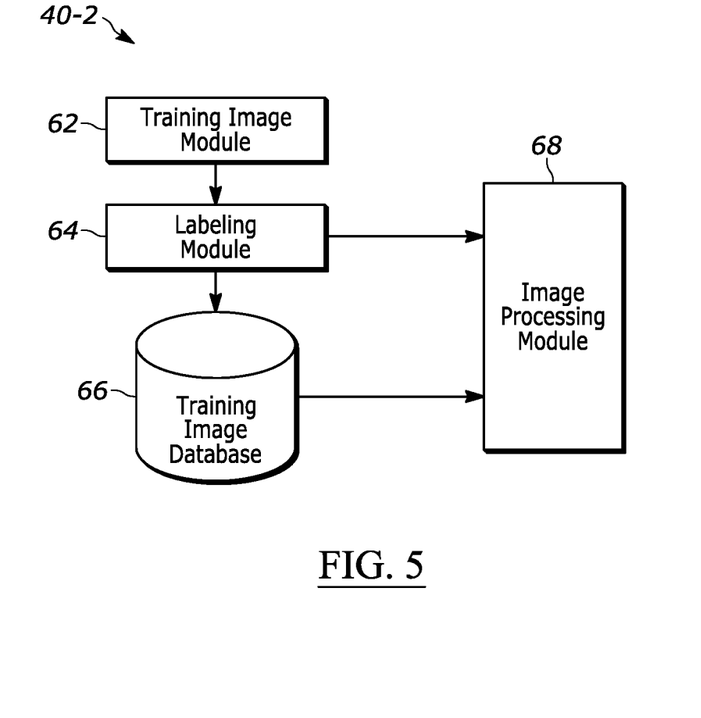
FIG. 5 is a functional block diagram of a convolutional neural network in accordance with the teachings of the present disclosure.

As another example and referring to FIG. 5, AI system 40-2 (as the AI system 40) is a CNN that includes a training image module 62, a labeling module 64, a training image database 66, and an image processing module 68. When the AI system 40-2 is untrained and while the die process controller 29 is controlling the one or more machining tools 28 to perform the machining tool operation, the training image module 62 obtains image data indicative of the machining tool operations and the positions of the robotic arms 25 and generates a training image. Furthermore, the training image module 64 appends the training image with the die sensor data and/or the inputs received by the input device 34.

The labeling module 64 labels, based on an operator input, the training image based on a comparison between the die sensor data and the die tolerance condition (e.g., the training image is labeled as a valid image if the die sensor data satisfies the die tolerance condition, and the training image is labeled as an invalid image if the die sensor data does not satisfy the die tolerance condition). The labeling module 64 stores the labeled training images in the training image database 66.

While training the AI system 40-2, the image processing module 68 is configured to perform known training routines to selectively update one or more parameters of the AI system 40-2 based on the labeled training images. As an example, the image processing module 68 may selectively adjust various parameters of a convolutional layer of the AI system 40-2, such as kernel dimensions, number of kernels, stride values, padding values, input/output channels, bit depths, feature map widths/lengths, weights and/or rectified linear unit (ReLU) activation layers. As another example, the image processing module 68 may selectively adjust various parameters of a downsampling layer of the AI system 40-2, such the type of downsampling routine (e.g., a maximum pooling routine, an average pooling routine, an L2-norm pooling routine, among other downsampling routines), kernel dimensions, and sliding values. When the AI system 40-2 is sufficiently trained, the image processing module 68 may obtain the image data from the image sensors 23 and the die sensor data and determine whether the surface roughness and/or dimensional parameters satisfy the die tolerance condition(s).

While the operator controller 32, the die process controller 29, and the modules of the AI system 40 are shown as separate elements, it should be understood that the operator controller 32, the die process controller 29, and at least a set of the modules of the AI system 40 may be provided by a single controller.

Figure 6:
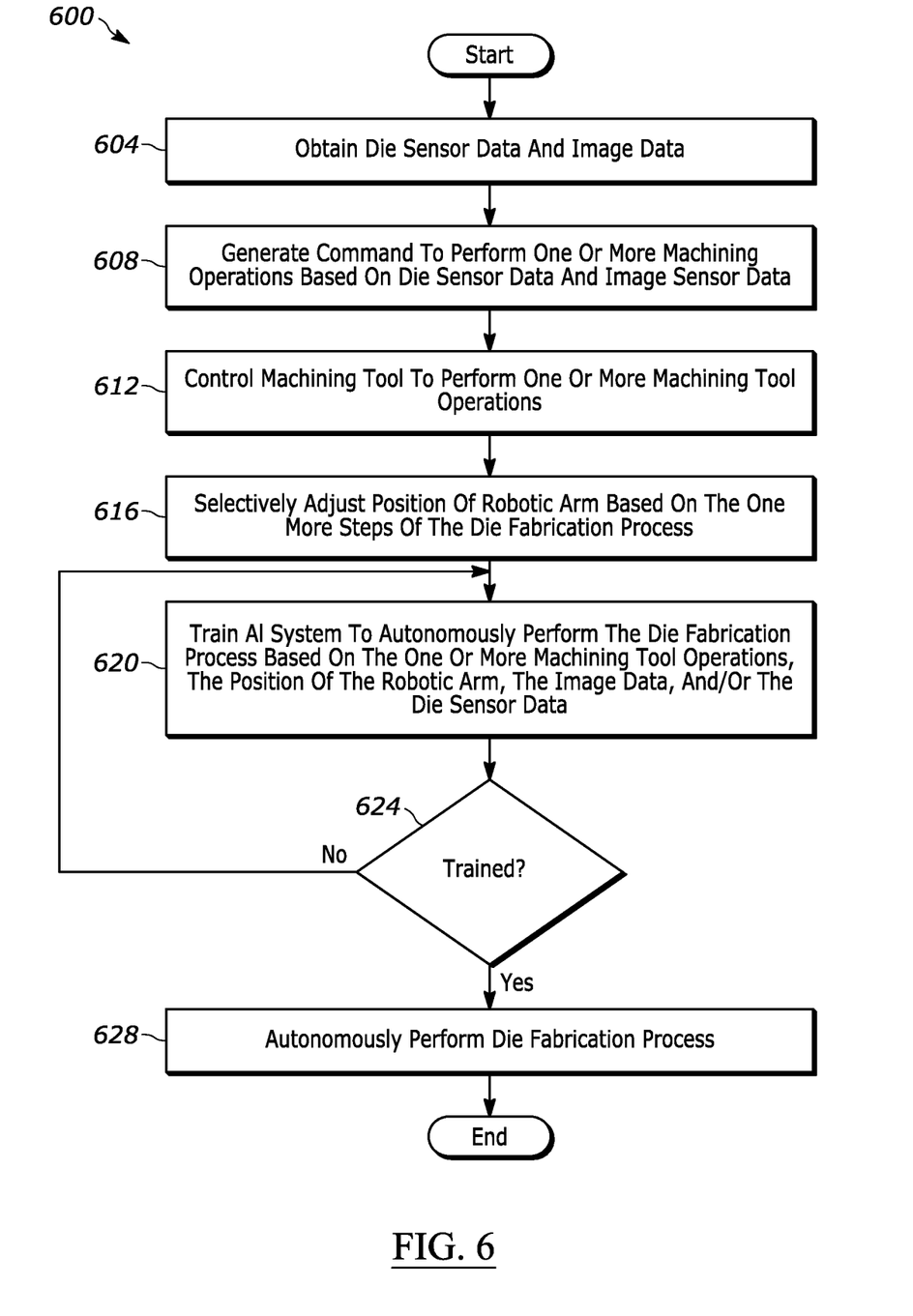
FIG. 6 is a flowchart of an example control routine in accordance with the teachings of the present disclosure.

Referring to FIG. 6, a routine 600 for automating a die fabrication process is shown. At 604, the operator controller 32 obtains die sensor data from the one or more die sensors 22 and image data from the one or more image sensors 23. At 608, the operator controller 32 generates a command to perform one or more machining tool operations based on the die sensor data and the image data. At 612, the die process controller 29 controls a machining tool to perform the one or more machining tool operations and selectively adjusts a position of the robotic arm 25 based on the one or more machining tool operations at 616. At 620, the die fabrication system 20 and/or the operator controller 32 train the AI system 40 to autonomously perform the die fabrication process based on the one or more machining tool operations, the position of the robotic arm 25, the image data, the die sensor data, or a combination thereof. At 620, the AI system 40 determines whether it is sufficiently trained. If so, the routine 600 proceeds to 628, where the AI system autonomously performs the die fabrication process. If the AI system 40 is not sufficiently trained at 624, the routine 600 proceeds to 620.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for automating a die fabrication process, the method comprising:
    obtaining, by one or more controllers, die sensor data from one or more die sensors and image data from one or more image sensors;
    generating, by the one or more controllers, a command to perform one or more machining tool operations based on the die sensor data and the image data;
    controlling, by the one or more controllers, a machining tool to perform the one or more machining tool operations;
    selectively adjusting, by the one or more controllers, a position of a robotic arm based on the one or more machining tool operations; and
    training, by the one or more controllers, an artificial intelligence system to autonomously perform the die fabrication process based on the one or more machining tool operations, the position of the robotic arm, the image data, the die sensor data, or a combination thereof.

2. The method of claim 1, wherein the command is based on an input generated by a haptic glove.

3. The method of claim 1, wherein the die sensor data is indicative of a surface roughness of a die, one or more dimensional parameters of the die, or a combination thereof, and wherein the one or more die sensors include an optical sensor, a range sensor, a digital micrometer, or a combination thereof.

4. The method of claim 1 further comprising generating, by a display device, a graphical element based on the image data, the die sensor data, or a combination thereof, wherein the display device is one of an augmented reality display device and a virtual reality display device.

5. The method of claim 4, wherein the graphical element includes the image data that is overlayed with the die sensor data.

6. The method of claim 4, wherein:
    the graphical element includes a first graphical element associated with a first portion of a die;
    the graphical element includes a second graphical element associated with a second portion of the die;
    the first graphical element is indicative of the first portion of the die satisfying a die tolerance condition; and
    the second graphical element is indicative of the second portion of the die not satisfying the die tolerance condition.

7. The method of claim 1, wherein the artificial intelligence system is a reinforcement learning network.

8. The method of claim 7, wherein training the reinforcement learning network to autonomously perform the die fabrication process further comprises:
    generating a state vector based on the one or more machining tool operations, the position of the robotic arm, an input received by the one or more controllers, and the die sensor data;
    defining one or more actions associated with the state vector, wherein each action from among the one or more actions includes performing a machining tool operation, adjusting the position of the robotic arm, or a combination thereof;
    determining a reward for each of the one or more actions; and
    generating a plurality of entries of a state-action database based on the one or more actions and the reward associated with the one or more actions, wherein the reinforcement learning network is configured to autonomously perform the die fabrication process based on the plurality of entries.

9. The method of claim 1, wherein the artificial intelligence system is a convolutional neural network.

10. The method of claim 9, wherein training the convolutional neural network to autonomously perform the die fabrication process further comprises:
    generating a training image based on the one or more machining tool operations, the position of the robotic arm, the image data, and the die sensor data;
    labeling the training image based on a comparison between the die sensor data and a die tolerance condition; and
    selectively adjusting one or more parameters of the convolutional neural network based on the training image and one or more additional training images.

11. A system for automating a die fabrication process, the system comprising:
    a processor; and
    a nontransitory computer-readable medium including instructions that are executable by the processor, wherein the instructions include:
        obtaining die sensor data from one or more die sensors and image data from one or more image sensors;
        generating a command to perform one or more machining tool operations based on the die sensor data and the image data;
        controlling a machining tool to perform the one or more machining tool operations;
        selectively adjusting a position of a robotic arm based on the one or more machining tool operations; and
        training an artificial intelligence system to autonomously perform the die fabrication process based on the one or more machining tool operations, the position of the robotic arm, the image data, the die sensor data, or a combination thereof, wherein the artificial intelligence system is one of a reinforcement learning network and a convolutional neural network.

12. The system of claim 11, wherein the command is based on an input generated by a haptic glove.

13. The system of claim 11, wherein the die sensor data is indicative of a surface roughness of a die, one or more dimensional parameters of the die, or a combination thereof, and wherein the one or more die sensors include an optical sensor, a range sensor, a digital micrometer, or a combination thereof.

14. The system of claim 11, wherein the instructions further comprise generating, by a display device, a graphical element based on the image data, the die sensor data, or a combination thereof, wherein the display device is one of an augmented reality display device and a virtual reality display device.

15. The system of claim 14, wherein the graphical element includes the image data that is overlayed with the die sensor data.

16. The system of claim 14, wherein:
the graphical element includes a first graphical element associated with a first portion of a die;
the graphical element includes a second graphical element associated with a second portion of the die;
the first graphical element is indicative of the first portion of the die satisfying a die tolerance condition; and
the second graphical element is indicative of the second portion of the die not satisfying the die tolerance condition.

17. The system of claim 11, wherein the artificial intelligence system is the reinforcement learning network, and wherein the instructions for training the reinforcement learning network to autonomously perform the die fabrication process further comprises:
generating a state vector based on the one or more machining tool operations, the position of the robotic arm, an input received by the one or more controllers, and the die sensor data;
defining one or more actions associated with the state vector, wherein each action from among the one or more actions includes performing a machining tool operation, adjusting the position of the robotic arm, or a combination thereof;
determining a reward for each of the one or more actions; and
generating a plurality of entries of a state-action database based on the one or more actions and the reward associated with the one or more actions, wherein the reinforcement learning network is configured to autonomously perform the die fabrication process based on the plurality of entries.

18. The system of claim 11, wherein the artificial intelligence system is a convolutional neural network, and wherein the instructions for wherein training the convolutional neural network to autonomously perform the die fabrication process further comprise:
generating a training image based on the one or more machining tool operations, the position of the robotic arm, the image data, and the die sensor data;
labeling the training image based on a comparison between the die sensor data and a die tolerance condition; and
selectively adjusting one or more parameters of the convolutional neural network based on the training image and one or more additional training images.

19. A method for automating a die fabrication process, the method comprising:
obtaining, by one or more controllers, die sensor data from one or more die sensors and image data from one or more image sensors;
generating, by the one or more controllers, a command to perform one or more machining tool operations based on the die sensor data and the image data;
controlling, by the one or more controllers, a machining tool to perform the one or more machining tool operations;
selectively adjusting, by the one or more controllers, a position of a robotic arm based on the one or more machining tool operations; and
training, by the one or more controllers, an artificial intelligence system to autonomously perform the die fabrication process based on the one or more machining tool operations, the position of the robotic arm, the image data, the die sensor data, or a combination thereof, wherein the artificial intelligence system is one of a reinforcement learning network and a convolutional neural network.

20. The method of claim 19, wherein the artificial intelligence system is the reinforcement learning network, and wherein training the reinforcement learning network to autonomously perform the die fabrication process further comprises:
generating a state vector based on the one or more machining tool operations, the position of the robotic arm, an input received by the one or more controllers, and the die sensor data;
defining one or more actions associated with the state vector, wherein each action from among the one or more actions includes performing a machining tool operation, adjusting the position of the robotic arm, or a combination thereof;
determining a reward for each of the one or more actions; and
generating a plurality of entries of a state-action database based on the one or more actions and the reward associated with the one or more actions, wherein the reinforcement learning network is configured to autonomously perform the die fabrication process based on the plurality of entries.

* * * * *